US008893819B2

(12) United States Patent
Herr

(10) Patent No.: US 8,893,819 B2
(45) Date of Patent: Nov. 25, 2014

(54) HAND-HELD POWER TOOL

(75) Inventor: Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 12/951,750

(22) Filed: Nov. 22, 2010

(65) Prior Publication Data

US 2011/0147023 A1    Jun. 23, 2011

(30) Foreign Application Priority Data

Dec. 18, 2009  (DE) .......................... 10 2009 054 923

(51) Int. Cl.
*B25B 21/02* (2006.01)
*B23B 45/00* (2006.01)
*B25B 23/14* (2006.01)

(52) U.S. Cl.
CPC ............ *B25B 23/141* (2013.01); *B23B 45/008* (2013.01); *B23B 2260/0445* (2013.01)
USPC .............................. 173/48; 173/216; 173/178

(58) Field of Classification Search
USPC .................. 173/176, 178, 48, 216, 217, 47
See application file for complete search history.

(56) References Cited

U.S. PATENT DOCUMENTS

| 3,937,036 | A | 2/1976 | Sauerwein | |
|---|---|---|---|---|
| 3,942,337 | A | 3/1976 | Leonard | |
| 4,263,996 | A | 4/1981 | Putney | |
| 4,892,013 | A | 1/1990 | Satoh | |
| 5,882,153 | A * | 3/1999 | Mack et al. | 408/240 |
| 5,988,958 | A * | 11/1999 | Mack | 408/240 |
| 6,142,243 | A | 11/2000 | Mayer | |
| 6,874,585 | B2 * | 4/2005 | Zhao | 173/48 |
| 7,168,503 | B1 * | 1/2007 | Teng | 173/48 |
| 7,455,123 | B2 * | 11/2008 | Aeberhard | 173/178 |
| 8,322,457 | B2 * | 12/2012 | Mok et al. | 173/48 |
| 2009/0206122 | A1 * | 8/2009 | King | 227/142 |
| 2011/0000692 | A1 * | 1/2011 | Roehm | 173/47 |

FOREIGN PATENT DOCUMENTS

DE    20302793 U1    4/2003
JP    2006123080    5/2006

* cited by examiner

*Primary Examiner* — Andrew M Tecco
(74) *Attorney, Agent, or Firm* — Kenyon & Kenyon LLP

(57) ABSTRACT

The invention relates to a hand-held power tool with a drive shaft embodied in the form of a spindle shaft, which is connected to a tool-clamping device. The drive shaft, which is coupled to a drive motor, cooperates with a torque clutch. The torque clutch is provided with a clutch-adjusting ring that is coupled to a transmission element that cooperates with at least one clutch-adjusting device in order to adjust a torque. The transmission element is situated in an axially and/or radially movable fashion on the outer circumference of a housing component. According to the invention, in at least one position of the clutch-adjusting ring, the transmission element protrudes axially beyond the housing component in the direction toward the tool-clamping device.

23 Claims, 2 Drawing Sheets

HAND-HELD POWER TOOL

CROSS-REFERENCE TO RELATED APPLICATION

This application is based on German Patent Application 10 2009 054 923.4 filed on Dec. 18, 2009.

BACKGROUND OF THE INVENTION

1. Field of the Invention

The invention relates to a hand-held power tool.

2. Description of the Prior Art

A hand-held power tool of this kind is known from DE 10 2008 000 470 A1. In the known hand-held power tool, in order to shorten the overall axial length, a clutch-adjusting ring protrudes axially beyond the clamping jaws of a tool-clamping device in at least one end position of the tool-clamping jaws. In DE 10 2008 000 470 A1, the clutch-adjusting ring cooperates with an adjusting nut that has an internal thread that cooperates with an external thread embodied on a transmission housing. In this case, the external thread on the transmission housing has an axial length such that the adjusting nut is situated with all of its thread turns completely on the external thread of the transmission housing in all positions of the clamping jaws.

OBJECT AND SUMMARY OF THE INVENTION

Based on the above-cited prior art, the object of the invention is to modify a hand-held power tool, in a way that achieves a particularly compact design in the axial direction.

According to the invention, a transmission element is provided, which, in at least one position of the clutch-adjusting ring, protrudes axially beyond the housing component with which it cooperates, in the direction of the tool-clamping device. It is thus possible for the housing component to have an axially shortened overall length in comparison to the prior art, thus achieving the axially compact or shortened design.

An implementation of the invention that is preferable from a structural standpoint includes the provision that the transmission element is an adjusting nut or a cam ring; in the case of an adjusting nut, it has an internal thread that cooperates with an external thread provided on the housing component.

It is also advantageous if the tool-clamping device has a plurality of clamping jaws and the inner diameter of the adjusting nut or cam ring is greater than the envelope curve of the clamping jaws at the end oriented toward the transmission element. This achieves a particularly compact design of the hand-held power tool to the extent that the available space gained by means of the shortened housing component can be used by the tool-clamping device, which as a result, axially adjoins the housing component directly.

In order to achieve a good protection from the penetration of dust or dirt, another advantageous embodiment includes the provisions that the housing component is connected to a protective housing at its end oriented toward the tool-clamping device, the tool-clamping device engages in an internal space of the protective housing, and the transmission element radially encompasses the protective housing over at least a subregion of its length.

It is also particularly advantageous if the clutch-adjusting device is situated on an outer circumference of the protective housing and in at least one position of the tool-clamping device, the clutch-adjusting device axially overlaps with the tool-clamping device. Consequently, the protective housing simultaneously serves as a holder of the clutch-adjusting device, which can be situated in a space-saving way axially, in which it axially overlaps with the tool-clamping device.

In this connection, it is also particularly preferable for the clutch-adjusting device to include at least one spring retainer and one detent spring; the detent spring is situated in stationary fashion on the spring retainer and on an outside, has a detent geometry that cooperates with a counterpart geometry on the inside of the clutch-adjusting ring. By means of its detent geometry, the detent spring, which is used to lock the clutch, produces the audible clicking that acoustically signals the user that the shifting of the clutch-adjusting ring is occurring.

It is particularly preferable if the one position of the clutch-adjusting ring is the position of the torque clutch in which a minimal torque is transmitted to the drive shaft and tool-clamping device via the torque clutch. In this respect, even the relatively small axial region in which the transmission element is guided on the housing component is sufficient.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
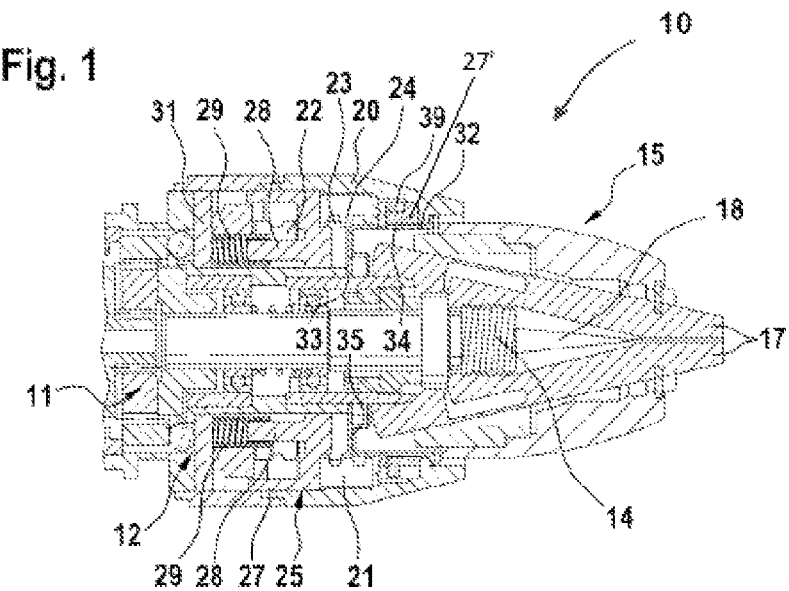
FIG. 1 shows a longitudinal section through the axial front part of a hand-held power tool according to the invention.

FIG. 1 shows the front part of a hand-held power tool 10 according to the invention. In particular, the hand-held power tool 10 is a battery-operated screwdriver, drill/driver, or impact drill.

On the left side in FIG. 1, the hand-held power tool 10 has a transmission 11 particularly embodied in the form of a planetary gear set that is coupled to a drive motor, not shown, of the hand-held power tool 10. The transmission 11 is connected via a torque clutch 12 to a drive shaft 14 embodied in the form of a spindle. The end of the drive shaft 14 on the right in FIG. 1 is coupled to a tool-clamping device 15, which preferably has three clamping jaws 17 situated at equidistant radial angular intervals from one another, which are used for clamping a tool such as a drill bit or screwdriver bit. The three clamping jaws 17 are situated so that they can be adjusted both radially and axially by means of an adjusting sleeve 18. In order to open the clamping jaws 17 so as to insert a tool between the clamping jaws 17, the clamping jaws 17 are brought into a position in which they are moved axially in the direction toward the drive shaft 14, in the process of which the end regions of the clamping jaws 17 oriented toward the drive shaft 14 are simultaneously moved radially outward. In the position shown in FIG. 1, the end regions of the clamping jaws 17 oriented toward the drive shaft 14 are at their maximum distance from one another.

A clutch-adjusting ring 20 can be moved by the user, particularly in rotary fashion, in order to influence the maximum torque that can be transmitted to the tool-clamping device 15 via the transmission 11. The clutch-adjusting ring 20 cooperates with an adjusting nut 21 that is situated in an axially adjustable housing element embodied on the transmission housing 22. To this end, the transmission housing 22 has an external thread 23 that cooperates with an internal thread 24 of the adjusting nut 21. The end surface of the adjusting nut 21 oriented away from the tool-clamping device 15 cooperates with a clutch-adjusting device 25.

The clutch-adjusting device 25 has a spring retainer 27 that has a plurality of pin-shaped extensions 28, which are spaced radially apart from one another at uniform angular intervals and are used to guide compression springs 29. The compression springs 29 act on a clutch plate 31 in such a way that when the pressure of the compression springs 29 is increased, a higher torque is exerted on the drive shaft 14 via the torque clutch 12.

The higher the torque to be transmitted via the torque clutch 12, the more the spring retainer 27 must be moved in the direction toward the clutch plate 31 and thus the more the adjusting nut 21 must also be moved in the direction toward the clutch plate 31. An essential component of the invention is the fact that the dimensioning of the transmission housing 22 or more precisely, its axial length, is such that in at least one operating position, e.g. as shown in FIG. 1, the adjusting nut 21 protrudes axially beyond the transmission housing 22 in the direction toward the tool-clamping device 15. This can be implemented structurally since in the position shown in FIG. 1, the spring retainer 27 and adjusting ring 21 have reached their one end position in which the torque to be transmitted via the torque clutch 12 assumes its minimum. To this extent, the relatively few remaining shared thread turns between the external thread 23 and the internal thread 24 are also sufficient to exert the axial compressive force or clamping force on the clutch plate 31 via the spring retainer 27 and the compression springs 29.

It should also be noted that in lieu of an adjusting nut 21 that is situated on the transmission housing 22 in an axially adjustable fashion by means of an internal thread 24, it is also conceivable to use a cam ring, which, through a corresponding geometrical embodiment, it is likewise able to axially move elements such as compression springs 29. Although a cam ring of this kind is already generally known in the hand-held power tools being discussed here, in an abundance of caution, the reader is referred to the applicant's DE 10 2004 058 807 A1 in which a cam ring of this kind is described.

The end of the transmission housing 22 oriented toward the tool-clamping device 15 is provided with a cup-shaped protective housing 32. In this case, the protective housing 32 has a central opening 33 or passage, in particular to encompass the drive shaft 14. A cylindrically extending wall 34 of the protective housing 32 in this case is approximately aligned with the outer circumference of the transmission housing 22 in the region of the root of the external thread 23. Consequently, in the end position of the adjusting nut 21 shown in FIG. 1, the adjusting nut 21 can radially encompass the protective housing 32 in the vicinity of the wall 34.

The drawing also shows that in the end position shown in FIG. 1, the clamping jaws 17 of the tool-clamping device 15 extend into the vicinity of the base 35 of the protective housing 32. Consequently, it is also possible for an axial overlapping to occur between the adjusting nut 21 and the end regions of the clamping jaws 17. Accomplishing this requires the inner diameter of the adjusting nut 21 or the diameter of the protective housing 32 in the region of the wall 34 to be at least as great as the envelope curve of the end regions of the clamping jaws 17 in the end position depicted in FIG. 1.

Figure 2:
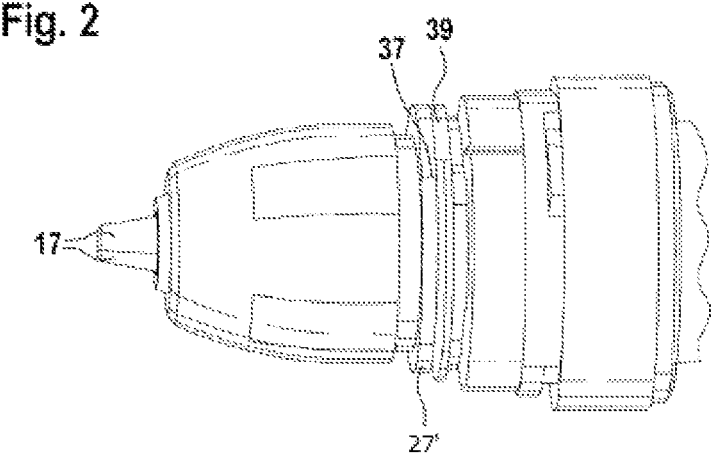
FIG. 2 is a perspective view from the outside of the front part of the hand-held power tool according to FIG. 1 in which various components have been left out for the sake of clarity.
Figure 3:
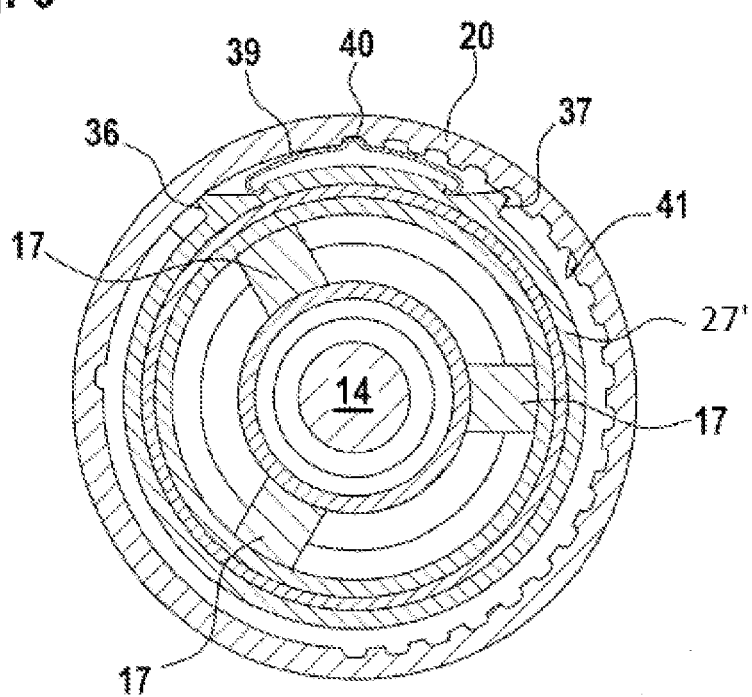
FIG. 3 shows a cross-section through the hand-held power tool according to FIG. 1 in the region of the clutch-locking device.

On the outer circumference of the wall 34 of the protective housing 32, as is most clearly visible in FIGS. 2 and 3, the detent spring retainer 27' has two end stops 36 and 37 that limit the radial rotatability of the clutch-adjusting ring 20 and thus define the minimum and maximum torque to be transmitted via the torque clutch 12. As is most clearly visible in FIG. 3, in the region between the two end stops 36 and 37 of the detent spring retainer 27', a detent spring 39 that has a detent projection 40 on its outside is affixed to the detent spring retainer 27' in a form-locked fashion. The detent projection 40 cooperates with a counterpart geometry 41, which is embodied on the inside of the clutch-adjusting ring 20, and haptically informs the user of a detent engagement as the clutch-adjusting ring 20 is rotated. At the same time, during the rotation of the clutch-adjusting ring 20, the detent projection 40 and the counterpart geometry 41 produce a noise that is audible to the user in the intended fashion.

It should also be noted that in a modification to the above-described exemplary embodiment, the detent spring 39 can also be arranged on the clutch-adjusting ring 20. In this case, the counterpart geometry 41 is then embodied, for example, on the detent spring retainer 27' or on another structural element; this may require a redesign of the components.

The foregoing relates to preferred exemplary embodiments of the invention, it being understood that other variants and embodiments thereof are possible within the spirit and scope of the invention, the latter being defined by the appended claims.

The invention claimed is:

1. A hand-held power tool comprising a drive shaft embodied in the form of a spindle shaft which is connected to a tool-clamping device, the drive shaft being coupled to a drive motor and cooperating with a torque clutch, the torque clutch having a clutch-adjusting ring that is coupled to a transmission element cooperating with at least one clutch-adjusting device in order to adjust a torque, the transmission element being situated in an axially and/or radially movable fashion on an outer circumference of a housing component, and in at least one position of the clutch-adjusting ring, the transmission element protrudes axially beyond the housing component in a direction toward the tool-clamping device, wherein a cup-shaped protective housing is arranged at the housing component on a face oriented towards the tool-clamping device, wherein the tool-clamping device has a plurality of clamping jaws, wherein the transmission element encompasses the protective housing and the plurality of clamping jaws radially over at least a subregion of its length.

2. The hand-held power tool as recited in claim 1, wherein the transmission element is an adjusting nut.

3. The hand-held power tool as recited in claim 2, wherein the adjusting nut has an internal thread that cooperates with an external thread embodied on the housing component.

4. The hand-held power tool as recited in claim 3, wherein an inner diameter of the adjusting nut is greater than an envelope curve of the clamping jaws at an end thereof oriented toward the adjusting nut.

5. The hand-held power tool as recited in claim 4, wherein at an end thereof oriented toward the tool-clamping device, the housing component is connected to the protective housing, the tool-clamping device engages in an inner space of the protective housing, and the transmission element encompasses the protective housing radially over at least a subregion of its length.

6. The hand-held power tool as recited in claim 5, wherein the transmission element is situated on an outer circumference of the protective housing, and in at least one position of the tool-clamping device, the transmission element axially overlaps with the tool-clamping device.

7. The hand-held power tool as recited in claim 6, further comprising a spring retainer including one detent spring, the detent spring being mounted in stationary fashion on the spring retainer and on an outside thereof, wherein the detent spring has a detent geometry that cooperates with a counterpart geometry on an inside of the clutch-adjusting ring.

8. The hand-held power tool as recited in claim 7, wherein the spring retainer has end stops for the clutch-adjusting ring.

9. The hand-held power tool as recited in claim 8, wherein the one position of the clutch-adjusting ring is a position of the torque clutch in which the torque clutch transmits a minimal torque to the drive shaft and the tool-clamping device.

10. The hand-held power tool as recited in claim 9, wherein the transmission element is located on a transmission portion of the housing for a transmission that is operatively connected between the drive shaft and the drive motor.

11. The hand-held power tool as recited in claim 10, wherein the hand-held power tool is embodied as a battery-operated screwdriver, drill/driver, or impact drill.

12. The hand-held power tool as recited in claim 3, wherein at an end thereof oriented toward the tool-clamping device, the housing component is connected to the protective housing, the tool-clamping device engages in an inner space of the protective housing, and the transmission element encompasses the protective housing radially over at least a subregion of its length.

13. The hand-held power tool as recited in claim 2, wherein at an end thereof oriented toward the tool-clamping device, the housing component is connected to the protective housing, the tool-clamping device engages in an inner space of the protective housing, and the transmission element encompasses the protective housing radially over at least a subregion of its length.

14. The hand-held power tool as recited in claim 1, wherein at an end thereof oriented toward the tool-clamping device, the housing component is connected to the protective housing, the tool-clamping device engages in an inner space of the protective housing, and the transmission element encompasses the protective housing radially over at least a subregion of its length.

15. The hand-held power tool as recited in claim 14, wherein the transmission element is situated on an outer circumference of the protective housing, and in at least one position of the tool-clamping device, the transmission element axially overlaps with the tool-clamping device.

16. The hand-held power tool as recited in claim 15, further comprising a spring retainer including one detent spring, the detent spring being mounted in stationary fashion on the spring retainer and on an outside thereof, wherein the detent spring has a detent geometry that cooperates with a counterpart geometry on an inside of the clutch-adjusting ring.

17. The hand-held power tool as recited in claim 16, wherein the spring retainer has end stops for the clutch-adjusting ring.

18. The hand-held power tool as recited in claim 1, wherein the one position of the clutch-adjusting ring is a position of the torque clutch in which the torque clutch transmits a minimal torque to the drive shaft and the tool-clamping device.

19. The hand-held power tool as recited in claim 1, wherein the transmission element is located on a transmission portion of the housing for a transmission that is operatively connected between the drive shaft and the drive motor.

20. The hand-held power tool as recited in claim 1, wherein the hand-held power tool is embodied as a battery-operated screwdriver, drill/driver, or impact drill.

21. A hand-held power tool comprising:
a drive shaft embodied in the form of a spindle shaft which is connected to a tool-clamping device, the tool-clamping device including a plurality of clamping jaws, the drive shaft being coupled to a drive motor and cooperating with a torque clutch, the torque clutch having a clutch-adjusting ring that is coupled to a transmission element cooperating with at least one clutch-adjusting device in order to adjust a torque, the transmission element being situated in an axially and/or radially movable fashion on an outer circumference of a housing component, and in at least one position of the clutch-adjusting ring, the transmission element protrudes axially beyond the housing component in a direction toward the tool-clamping device and partially overlaps axially with the plurality of clamping jaws,
wherein a cup-shaped protective housing is arranged at the housing component on a face oriented towards the tool-clamping device,
wherein the transmission element encompasses the protective housing radially over at least a subregion of its length.

22. A hand-held power tool comprising:
a drive shaft embodied in the form of a spindle shaft which is connected to a tool-clamping device, the drive shaft being coupled to a drive motor and cooperating with a torque clutch, the torque clutch having a clutch-adjusting ring that is coupled to a transmission element cooperating with at least one clutch-adjusting device in order to adjust a torque, the transmission element being situated in an axially and/or radially movable fashion on an outer circumference of a housing component, a cup-shaped protective housing is arranged at the housing component on a face oriented towards the tool-clamping device, and in at least one position of the clutch-adjusting ring, the transmission element protrudes axially beyond the housing component in a direction toward the tool-clamping device and radially encompasses the protective housing,
wherein the tool-clamping device has a plurality of clamping jaws,
wherein the transmission element encompasses the plurality of clamping jaws radially over at least a subregion of its length.

23. A hand-held power tool comprising:
a drive shaft embodied in the form of a spindle shaft which is connected to a tool-clamping device, the drive shaft being coupled to a drive motor and cooperating with a torque clutch, the torque clutch having a clutch-adjusting ring that is coupled to a transmission element cooperating with at least one clutch-adjusting device in order to adjust a torque, the transmission element being situated in an axially and/or radially movable fashion on an outer circumference of a housing component, wherein the transmission element has an internal thread that cooperates with an external thread of the housing component, and in an end position of the clutch-adjusting ring, the transmission element protrudes axially beyond the housing component in a direction toward the tool-clamping device such that at least one turn of the internal thread of the transmission element does not cooperate with a turn of the external thread of the housing component,
wherein a cup-shaped protective housing is arranged at the housing component on a face oriented towards the tool-clamping device, wherein the tool-clamping device has a plurality of clamping jaws,
wherein the transmission element encompasses the protective housing and the plurality of clamping jaws radially over at least a subregion of its length.

* * * * *